March 17, 1925.
A. H. MOELLER
CYCLE SADDLE CLAMP
Filed April 18, 1921
1,529,845
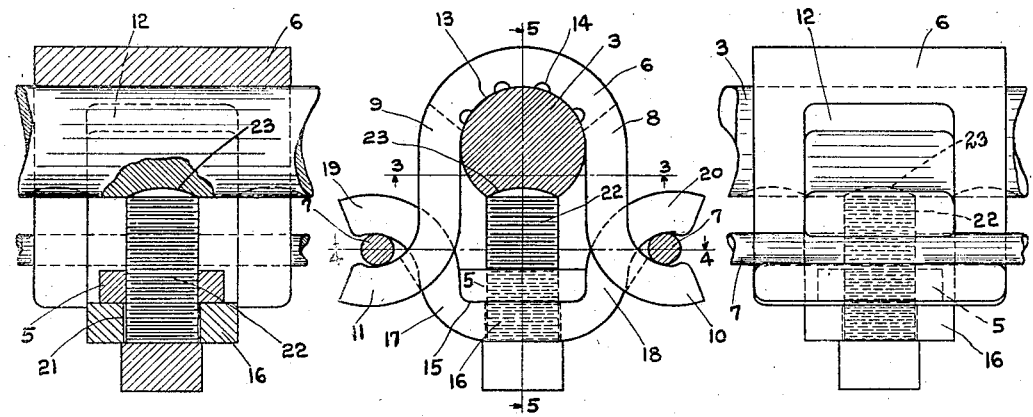
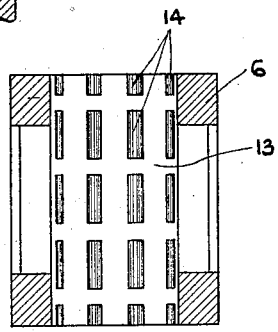
INVENTOR
Adam H. Moeller
BY
Richey Slough & Watts.
HIS ATTORNEYS.

Patented Mar. 17, 1925.

1,529,845

UNITED STATES PATENT OFFICE.

ADAM H. MOELLER, OF ELYRIA, OHIO, ASSIGNOR TO THE TROXEL MANUFACTURING COMPANY, OF ELYRIA, OHIO, A CORPORATION OF OHIO.

CYCLE SADDLE CLAMP.

Application filed April 18, 1921. Serial No. 462,186.

*To all whom it may concern:*

Be it known that I, ADAM H. MOELLER, a citizen of the United States, residing at Elyria, in the county of Lorain and State of Ohio, have invented certain new and useful Improvements in Cycle Saddle Clamps; and I do hereby declare the following to be a full, clear, concise, and exact description of the invention, such as will enable others skilled in the art to which it appertains to make and use the same.

My invention relates to cycle saddle clamps, or means for securing a saddle, such as a bicycle or motorcycle saddle, to the saddle-post of the vehicle.

The principal object of my invention is to provide means for connecting the saddle to the post, which can be conveniently and cheaply made, and which will be more effective in performing the functions required of it than clamps hitherto in use, and with which I am familiar.

Another object of my invention is to reduce the number of parts required in devices hitherto in use for this purpose.

A further object of my invention is to provide a structure which can be made of sheet metal stampings, instead of having to make some of the more important parts of forgings or castings, which has been the practice, and in which practice these parts have had to be machined.

A further object of my invention is to provide a saddle clamp made of sheet metal stampings, which will securely grip the saddle-post and retain the saddle in correct adjusted position, even when roughly used.

Another object of my invention is to provide a structure, comprising a plurality of parts, which will hold together while being shipped.

Other objects of my invention and the invention itself will be better understood by reference to the drawings forming a part of this specification, and in which drawings Fig. 1 shows an end elevational view of a saddle clamp, constituting an embodiment of my invention, the parts being in the position they would assume when supporting a saddle to a saddle-post, the saddle-post in this view being shown in vertical cross-section, as are also the longitudinally extending truss members attached to the saddle.

Fig. 2 shows a side elevational view of the clamp illustrated in Fig. 1.

Fig. 3 shows a cross-sectional view taken on the line 3—3 of Fig. 1, the view being that seen looking from below.

Fig. 4 shows a cross-sectional view taken on the line 4—4 of Fig. 1, the view being taken looking downwardly.

Fig. 5 shows a vertical cross-sectional view of the clamp illustrated in the foregoing figures, the section being taken on the line 5—5 of Fig. 1.

Fig. 6 shows the device in position on a saddle post carrying a saddle.

Referring now to the drawings, in all of the figures of which like parts are designated by like reference characters, at 6 is shown the clip member which immediately engages the saddle-post, indicated at 3, the member 6 being in the form of a loop having side arms 8 and 9, said side arms terminating at their lower ends in outwardly extending extensions 10 and 11. The saddle-post gripping surface 13 of the clip 6 I preferably provide with grooves 14, making said surface 13 rough so as to grip more firmly the round, smooth saddle-post.

Co-operating with the clip member 6 is an inverted, substantially U-shaped, member 16 having a flat intermediate portion 15 and upwardly extending side arms 17 and 18, said side arms having truss member gripping extensions 19 and 20, and which are adapted to pass through the elongated opening 12 in the middle portion of the clip, as shown, said extensions 19 and 20 co-operating with the extensions 11 and 10 of the clip 6, so as to grip the longitudinally extending truss member 7 attached to the saddle between the clip 6 and so-called U-shaped member 16. The member 15 has a central, vertically extending perforation 21, adapted to admit a bolt 22. I also provide a nut 5 adapted to be snugly seated on the intermediate flat portion 15 of the member 16, said nut being threaded and the threads on the bolt 22 being adapted to co-operate with the threads on the nut 5, so that the bolt 22 may be turned within the nut 5, so as to move the bolt longitudinally of the nut.

The saddle is secured to the saddle-post 3 by advancing the bolt 22 upwardly through the nut 5 positioned as indicated in Fig. 1 until the end of the bolt 22 contacts, as illustrated in Fig. 2, at 23 with the bottom of the post 3, and preferably in one of a plurality of indentations provided on the bottom of the saddle-post. At the same time, the longitudinally extending truss members 7, which are securely fastened to the bicycle saddle (not herein illustrated but understood), as is the practice, are placed between the jaw extensions 10, 11 of the clip 6 and 19, 20 of the U-shaped member 16, and the bolt 22 being tightened up against the bottom of the saddle-post 3 by turning the bolt clockwise, seen from below in the nut 5, the saddle-post 3 and the truss members 7 will be securely gripped between the clip 6 and the member 16.

Heretofore such a member as the member 16 has been constructed as a forging or a casting, in order to give it the necessary rigidity, but in the present application I reinforce the mid and side portions, where the member 15 requires rigidity, by the nut 5 seated snugly between the said side portions and resting upon the flat intermediate portion, so that no bending or flexing at these portions of the member 15 will be caused, even though by turning the bolt 22 up tightly the saddle is securely gripped to the saddle post.

It will be seen also that in this construction the clamp can be assembled with the parts in their proper relative position, and as so assembled they will remain together, so that one or more of the parts will not be lost in shipping.

Having thus described my invention in a specific embodiment, I wish it to be understood that I am aware that departures may be made from the embodiment herein illustrated, but such departures being within the scope of my invention, as defined in the appended claims.

What I claim is:

1. In a cycle saddle clamp, the combination with a pair of sheet metal stamped substantially U-shaped members, each sheet metal member having laterally extending clamping jaw extensions for each end, one of said members being inverted, the intermediate portion of said inverted member being adapted to embrace a cycle saddle post, a nut, said nut fitting snugly against the intermediate portion of the other member, a bolt, a perforation through said other member to admit the bolt, said nut being threaded on said bolt, the end of the bolt being adapted to be turned within said nut to clamp the post between the embracing inverted member and the bolt end, and at the same time causing opposing jaws of the two members to grip cycle saddle struts, said nut reinforcing the portion of the said other member between its jaws.

2. In a cycle saddle clamp, a cycle saddle-post, a pair of substantially U-shaped members, laterally extending clamping jaws for the ends of said members, said members being formed of shaped strips of sheet steel, one of said members being wider than the other and having its middle portion slotted, a nut, and a bolt, the narrower member being adapted to have its ends pass through the elongated opening of the wider member to cause its jaws to face the opposing jaws of the other member, said nut fitting against the mid portion of the narrow member's inner face, said narrow member being centrally perforated to admit the bolt, said bolt being threaded through said nut and projecting against the wider side of said cycle saddle-post to clamp the post against the inner mid face portion of the wider member, the said bolt also causing the opposing clamping jaws to approach to grip a saddle supporting member placed therebetween, said nut adapted to press against and reinforce said narrow member mid portion.

In witness whereof, I have hereunto set my hand.

ADAM H. MOELLER.